(12) United States Patent
Li et al.

(10) Patent No.: US 10,830,922 B2
(45) Date of Patent: Nov. 10, 2020

(54) AIR QUALITY FORECAST BY ADAPTING POLLUTANT EMISSION INVENTORY

(71) Applicant: International Business Machines Corporation, Armonk, NY (US)

(72) Inventors: Li Li, Beijing (CN); Liang Liu, Beijing (CN); Junmei Qu, Beijing (CN); ChaoQiang Zhu, Beijing (CN); Wei Zhuang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 871 days.

(21) Appl. No.: 14/924,886

(22) Filed: Oct. 28, 2015

(65) Prior Publication Data

US 2017/0124461 A1    May 4, 2017

(51) Int. Cl.
   *G01W 1/00*   (2006.01)
(52) U.S. Cl.
   CPC ........................... *G01W 1/00* (2013.01)
(58) Field of Classification Search
   CPC . G01W 1/00; G01W 2201/00; G06F 11/0793; G06F 8/658; G06F 11/079
   See application file for complete search history.

(56) References Cited

U.S. PATENT DOCUMENTS

| 8,190,367 B2 | 5/2012 | Bassa | |
| 8,949,677 B1 * | 2/2015 | Brundage | G06F 11/0745 714/48 |
| 2017/0076217 A1 * | 3/2017 | Krumm | G06N 7/005 |

FOREIGN PATENT DOCUMENTS

| CN | 102799772 | 11/2012 |
| CN | 103163278 | 6/2013 |
| KR | 100522087 | 10/2005 |

OTHER PUBLICATIONS

H. Elbern, A. Strunk, H. Schmidt, O. Talagrand. "Emission rate and chemical state estimation by 4-dimenstional variational inversion". Atmospheric Chemistry and Physics. 7, 3749-3769, 2007.*

K.V. George, P. Verma, S. Devotta. "Locating air quality monitoring station using wind impact area diagram." Environ Monit Assess (2008) 145:113-118.*

(Continued)

*Primary Examiner* — Li B. Zhen
*Assistant Examiner* — Markus A. Vasquez
(74) *Attorney, Agent, or Firm* — Fleit Intellectual Property Law; Jon Gibbons (57) ABSTRACT

Disclosed is a novel system, computer program product, and method to compute an air quality forecast. An air quality forecast model, air quality real-time monitoring data, and air quality forecast data is accessed. A deviation in air pollution emission is monitored by classifying a difference between the air quality monitoring data and the air quality forecast data. This monitoring includes classifying any weather differences which are caused by weather, classifying any terrain differences which are caused by a geographic terrain; and, filtering the difference caused by inaccurate pollution emission inventory. The monitoring may repeat in response to a given time period elapsing or a chance in air quality forecast data received.

12 Claims, 8 Drawing Sheets

(56) References Cited

OTHER PUBLICATIONS

J.D. Woods, On Richardson's number as a criterion for laminar-turbulent-laminar transition in the ocean and atmosphere, Radio Science, vol. 4, No. 12, pp. 1289-1298, Dec. 1969.*
Modak, Prasad M., and B. N. Lohani. "Optimization of ambient air quality monitoring networks." Environmental monitoring and assessment 5.1 (1985): 1-19. (Year: 1985).*
Yuval, et al., "Exploring the Applicability of Future Air Quality Predictions Based on Synoptic System Forecasts", Environmental Pollution, Mar. 6, 2012, pp. 1-10.
Air Quality Index China, "Air Quality Forecasting—How Accurate Can It Be?", http://aqicn.org/faq/2015-03-23/air-quality-forecasting-how-accurate-can-it-be, Mar. 23, 2015, pp. 1-7.
Earth System Research Laboratory, National Oceanic and Atmospheric Administration, "Air Quality Forecasting—A Review of Federal Programs and Research Needs", Jun. 2001, pp. 1-26.

* cited by examiner

Step 1: set the influence circle of the monitoring station
$(x-a)^2+(y-b)^2 = r^2$, where $(a,b)$ is the longitude of the monitoring station A, r is the monitoring area of the station
Step 2: compute the two tangent line (L1, L2) of the circle in the wind direction by solving below equations
1) $(x-a)^2+(y-b)^2 = r^2$
2) $\tan\alpha = y/x$
Step 3: compute the influence distance according to wind speed
By default, the distance is the wind speed in 1 hour
Step 4: divide the whole influence area by nearby monitoring stations in wind direction, the influence area is composed by below lines
1) $(x-a)^2+(y-b)^2 = r^2$
2) L1
3) L2
4) y=b', where b' is the latitude of the monitoring station B

AIR QUALITY FORECAST BY ADAPTING POLLUTANT EMISSION INVENTORY

BACKGROUND

The present invention generally relates to computer analytics, and more specifically to computer analytics as applied to air pollution.

Air pollution is a world-wide problem, accurately forecast air pollutant density is very important to the public, industry enterprise and the government.

Air pollution has many influence factors, several main factors include weather situation (e.g. wind direction, wind speed, temperature, humidity etc.), pollutant emission and terrain. These three factors are also the inputs for current popular air quality forecast models including Weather Research and Forecasting (WRF-CHEM), Congestion Mitigation and Air Quality Improvement (CMAQ), Comprehensive Air Quality Model with Extension (CMAx), Nested Air Quality Prediction Modeling System (NAQPMS), and others.

Accurately air pollution forecast is very difficult. Although terrain is relatively stable for a certain area, weather and pollutant emission is widely fluctuate. Pollution emission is closely related to human activities.

Current air pollution forecast method use static pollutant emission inventory. Currently forecast solutions can predict the pollution variation trend however, they do not provide an absolute value.

SUMMARY

Disclosed is a novel system, computer program product, and method to compute air quality forecasts. The solution uses a multilayer-nested closed-loop control process. This can be adapted to specific influence regions and industries.

More specifically, the computer-based method for air quality forecasts includes accessing an air quality forecast model, air quality real-time monitoring data, and air quality forecast data. A deviation in air pollution emission is monitored by classifying a difference between the air quality monitoring data and the air quality forecast data. This monitoring includes classifying any weather differences which are caused by weather, classifying any terrain differences which are caused by a geographic terrain; and, filtering the difference caused by inaccurate pollution emission inventory. The monitoring may repeat in response to a given settable time period elapsing or a chance in air quality forecast data received.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

2

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

The present invention improves air quality forecast accuracy. An important factor is to refine emission inventory. Current methods investigate main pollution emission by officers from environmental protection department, however, this is infeasible, for one thing, this will induce huge amount of human workload, for the other, pollution emission is a time-varying factor, static statistic value cannot accurately describe the pollution emission.

Another method is to deploy pollution emission monitoring sensors, however, due to the limitation of sensor number and sensor cost, it is again infeasible to monitor every pollutant source by deploying sensors.

Still another method is to use smoke as a popular tool. This makes pollution emission inventory for air quality forecast models; however, the main function is to transform the pollution emission from point source, surface source and linear source to grid. It does not involve how to dynamically adapt the pollution emission.

Non-Limiting Definitions

The terms "a", "an" and "the" are intended to include the plural forms as well, unless the context clearly indicates otherwise.

The term "air quality forecast data" is information related to gridded forecast guidance. Such data is available from the National Centers for Environmental Prediction (NCEP). Ozone and smoke data are also available.

The term "air quality forecast model" is an equation, typically using linear interpolation, with air quality real-time monitoring data to calculate air quality forecasts. One example is found from USA Environmental Protection Agency (EPA) found online at EPA website under Technical Air Pollution Resources The term "air quality real-time monitoring data" is information measured with sensors, such as cameras, spectrometers for particulates, and other specific sensor to measure ozone, sulfur dioxide, carbon monoxide and others. The measurement is parts-per-million for ozone, carbon monoxide, and sulfur dioxide. For particulate matter, the measurement is typically micro-grams/meter$^3$.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The term "computing environment" is used to mean a computing environment where applications, platforms, and infrastructure can be shared across many different users. One example of a computing environment is a cloud computing environment including private, public, and hybrid clouds. Service models for the computing environment include Infrastructure as a Service (IaaS), Platform as a Service (PaaS), and Software as a Service (SaaS).

The term "influence area" is geographic region or geographic area being influenced by air pollution. The influence area can be defined by two or more geographic positions, such as geographic coordinates or global positioning coordinates, of at least two air monitoring stations.

The term "pollution emission inventory" is used a level of pollution in a specific area, i.e., an influence area. There are various sources of pollution both inside and outside the influence area that create the pollution emission inventory. These sources of pollution include mobile sources—such as cars, buses, planes, trucks, and trains, stationary sources—such as power plants, oil refineries, industrial facilities, and factories, area sources—such as agricultural areas, cities, and wood burning fireplaces, and natural sources—such as wind-blown dust, wildfires, and volcanoes.

The term "weather" is used to mean the state of the atmosphere at a geographic location and time as regards heat, dryness, sunshine, wind, rain, or a combination thereof.

Operating Environment

Figure 1:
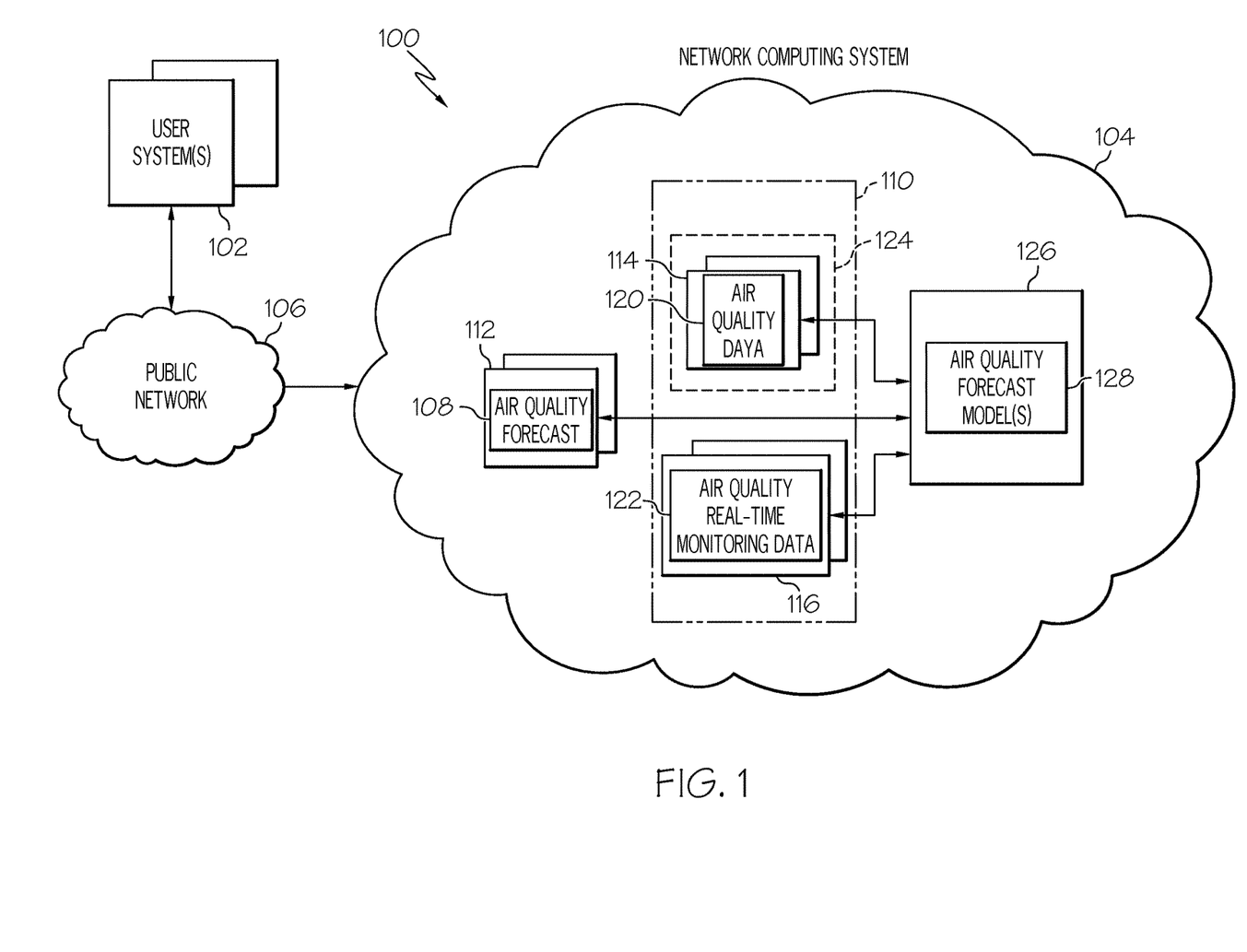
FIG. 1 is a block diagram illustrating one example of an operating environment.

FIG. 1 shows one example of an operating environment 100 for computing an air quality forecast in a network computing environment. It should be noted that although the following discussion is directed to a network or cloud computing environment various embodiment are not limited to such environment and are application to non-cloud computing environments as well. In particular, FIG. 1 shows one or more client/user systems 102 communicatively coupled to one or more network computing environments 104 via a public network 106 such as the Internet. The user systems 102 can include, for example, information processing systems such as desktop computers, laptop computers, servers, wireless devices (e.g., mobile phones, tablets, personal digital assistants, etc.), and the like.

The user systems 102 access the network computing environment 106 via one or more interfaces (not shown) such as a web browser, application, etc. to utilize resources provided by the environment 104. For example, FIG. 1 shows a plurality of resources such as air quality forecast application 108 and computing resources 110 available within the network computing environment 104. Computing resources 110 include but are not limited to, processing, storage, networking, and other fundamental computing resources. Resources 108, 110 are provided by and/or are hosted on a plurality of physical information processing systems 112, 114, 116. Access to air quality data 120 and air quality real-time monitoring data 116 is shown.

A plurality of physical systems 112, 114, 116, virtual machines (not shown) or a combination thereof grouped together for providing a resource(s) is referred to as a "cluster" 124.

In one example, a user (via a user system 102) utilizes the network computing environment 104 to deploy a multi-tier web application. In this example, a multi-tier web application is an application (software designed to enable a user to perform a given task) accessible over a network whose presentation, logic (application processing), and data storage processes are performed at physically separate tiers. For example, the presentation processes can be performed on a web server tier; the application processing can be performed on an application server tier; and the data storage processes can be performed on a database server tier.

The cloud computing environment 104 further comprises one or more information processing systems 126 that comprise one or more air quality forecast models 128. Examples of air quality forecast models include any combination of Weather Research and Forecasting (WRF-CHEM), Congestion Mitigation and Air Quality Improvement (CMAQ), Comprehensive Air Quality Model with Extension (CMAx), Nested Air Quality Prediction Modeling System (NAQPMS), and others.

It should be noted that the information processing system 126 is not required to reside within the cloud environment 106. For example, the air quality forecast models 128 may provide air quality forecasts across multiple server tiers in the plurality of sever tiers for a set of workloads.

Overall Work Flow Diagram of Monitoring a Derivation in Air Pollution Emissions

Figure 2:
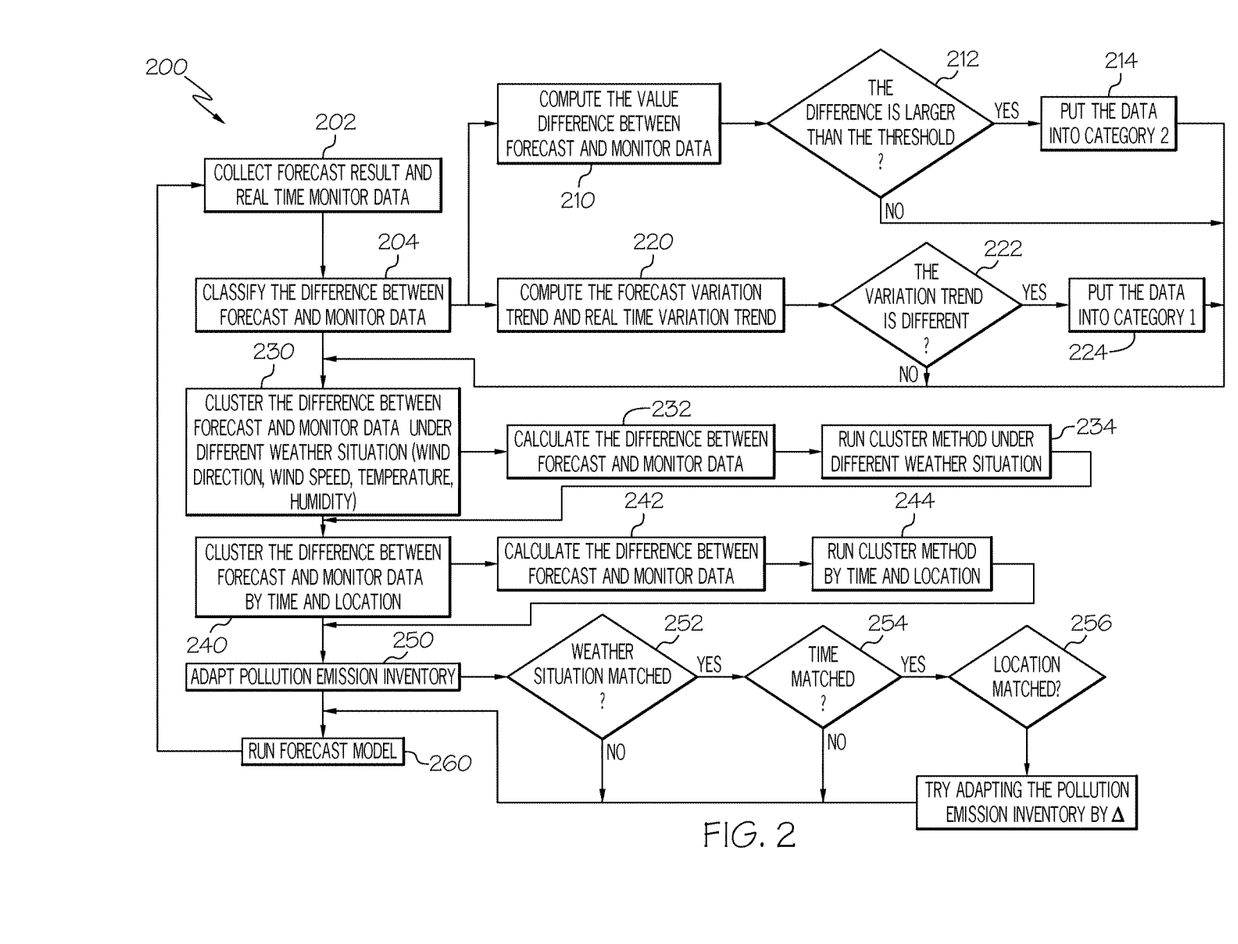
FIG. 2 is a workflow diagram illustrating monitoring a deviation in air pollution emission using the system of FIG. 1.

Turning to FIG. 2 shown is a workflow diagram 200 illustrating monitoring a deviation in air pollution emission using the system of FIG. 1. The process is a continuous process and can start at various portions. For the sake of this discussion, the process begins in step 202 to collect air quality real time monitoring data, and air quality forecast data.

The process continues to step 204 in which the difference or deviation between forecast data and monitor data is determined. In this example, there are two parallel paths. The first path 210, 212, 214 is to compute the value difference between forecast and monitor data. If the difference is larger than a threshold, the data is put into category 2. The second parallel path 220, 222, 224 is to compute the forecast variation trend. If the difference is larger than a threshold, the data is put into category 1. In the event that the threshold is not met in either of the two parallel paths, the process returns to step 230 as shown. This is used to minimize the gap between air forecast model and air quality real-time monitoring data.

In step 230, the similar data is grouped or clustered. Specifically, the difference between forecast and monitor data under different weather situation, including wind direction, wind speed, temperature, humidity, are grouped together. The difference between the forecast and monitor data is calculated in step 232. The cluster or grouping method may be run under different weather situations in step 234.

Next is step 240, the difference between forecast and monitor data by time and location is clustered. The difference between forecast and monitor data is calculated. The cluster or grouping method may be run by time and location in step 244.

Next, the pollution emission inventory in step 250 is adapted eliminating the influence caused by weather 252, by time 254, and by location 256. The pollution emission inventory is adapted by the deltas. Finally the forecast model in step 260 may be run again. In one example it is run again if there is a change in the air quality forecast data, and detecting a chance in the air quality real-time monitoring data.

Work Flow Diagram to Adapt Emission Inventory

Figure 3:
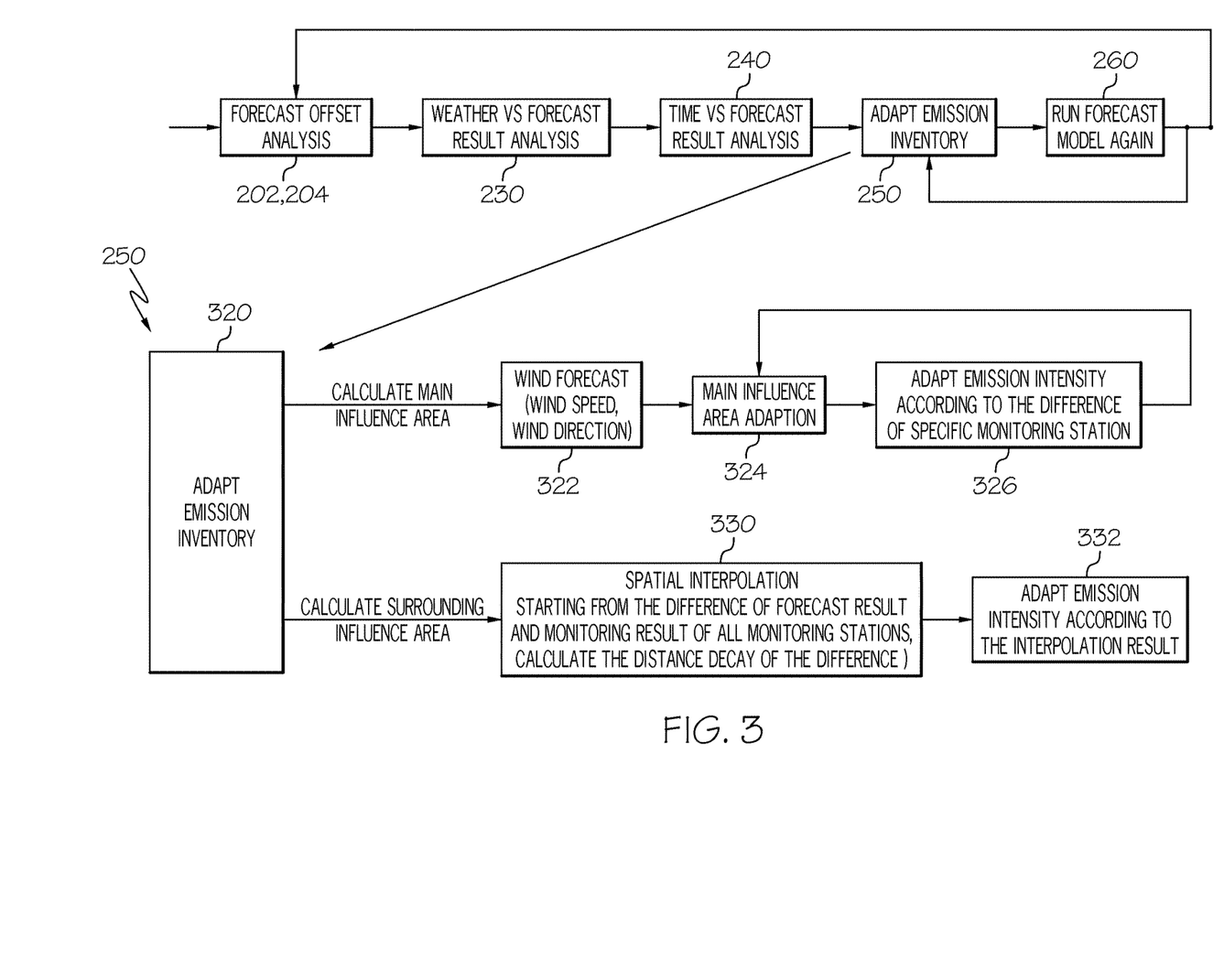
FIG. 3 is a workflow diagram illustrating adapting the pollution emission inventory of FIG. 2.

Turning to FIG. 3 is a workflow diagram 300 illustrating adapting the pollution emission inventory of FIG. 2. The process begins with the forecast offset analysis 202, 204. There are two components: weather versus forecast results analyses 230, and time versus forecast analysis 240.

The emission inventory is adapted in 250 and the air quality forecast model run again in step 260. Also, the overall process is designed to iterate back to step 202, 204 as shown.

To adapt the emission inventory includes two flow paths. The first flow path includes the main influence area or influence region is calculated. The wind forecast including wind speed and direction is determined in step 322. The main influence area adaption 324 is performed by adapting the emission intensity according to the difference of specific monitoring station in step 326.

The second flow path is spatial interpolation 330 starting from the difference of forecast result and monitoring result of all monitoring stations, calculate the distance decay of the difference. Adapt emission intensity according to the interpolation result in step 332.

Calculate and Adapt Influence Area

Figure 4:
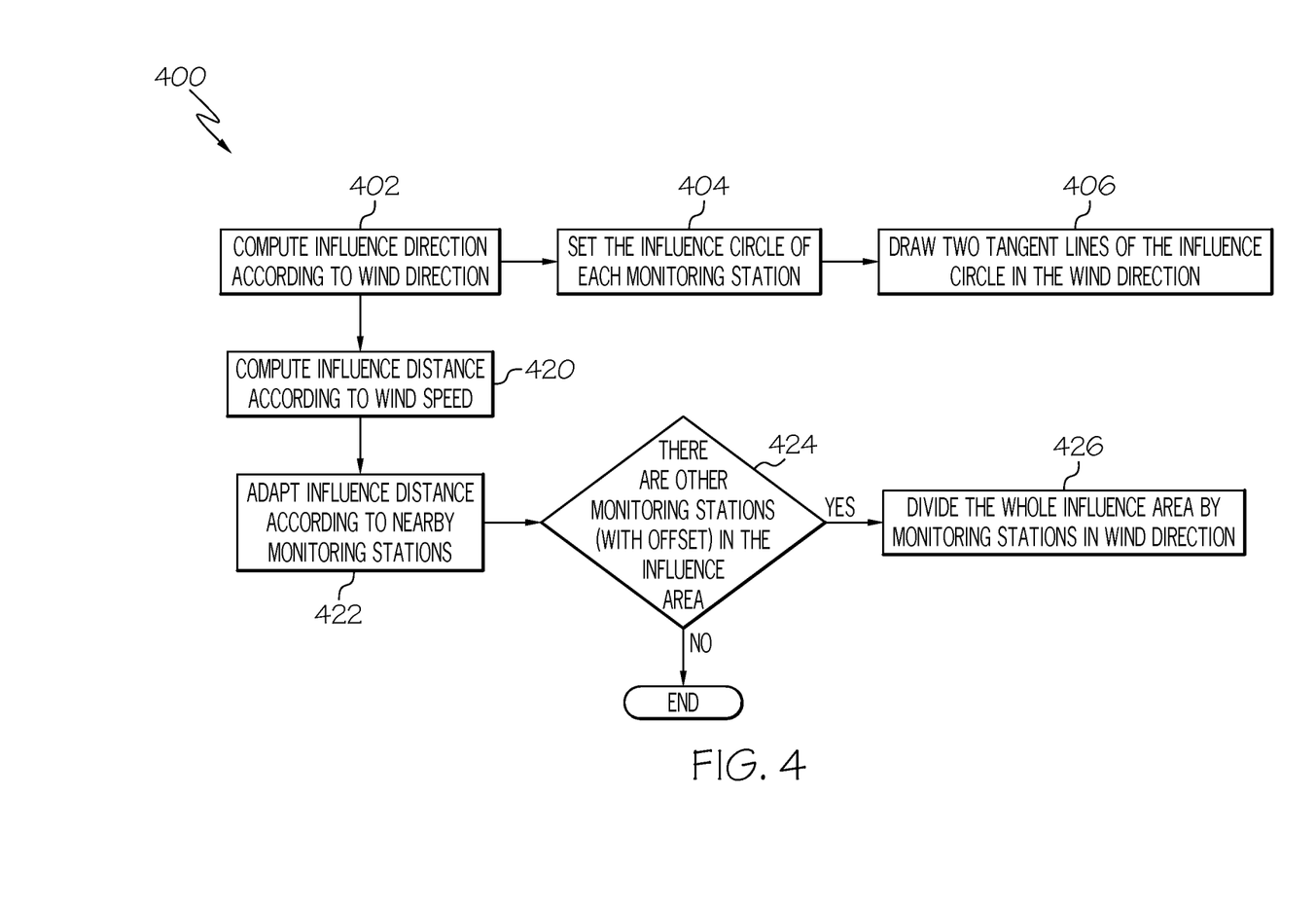
FIG. 4 is a workflow diagram illustrating adapting the influence area of FIG. 3.

Turning now to FIG. 4 is a workflow diagram 400 illustrating adapting the influence area of FIG. 3. The process begins in step 402 to compute influence direction according to wind direction. The influence circle or region (variable r in FIG. 5 and FIG. 6) of each monitoring station is set in step 404. Draw two tangent lines of the influence circle in the wind direction as shown in FIG. 6.

In step 420 the influence distance is computed according to wind speed. The influence distance by default is the wind speed in 1 hour, it is adapted according to nearby monitoring stations in step 422. There are other monitoring stations (with offset) in the influence area in step 424 i.e. variable b in FIG. 5 and FIG. 6.

Figure 5:
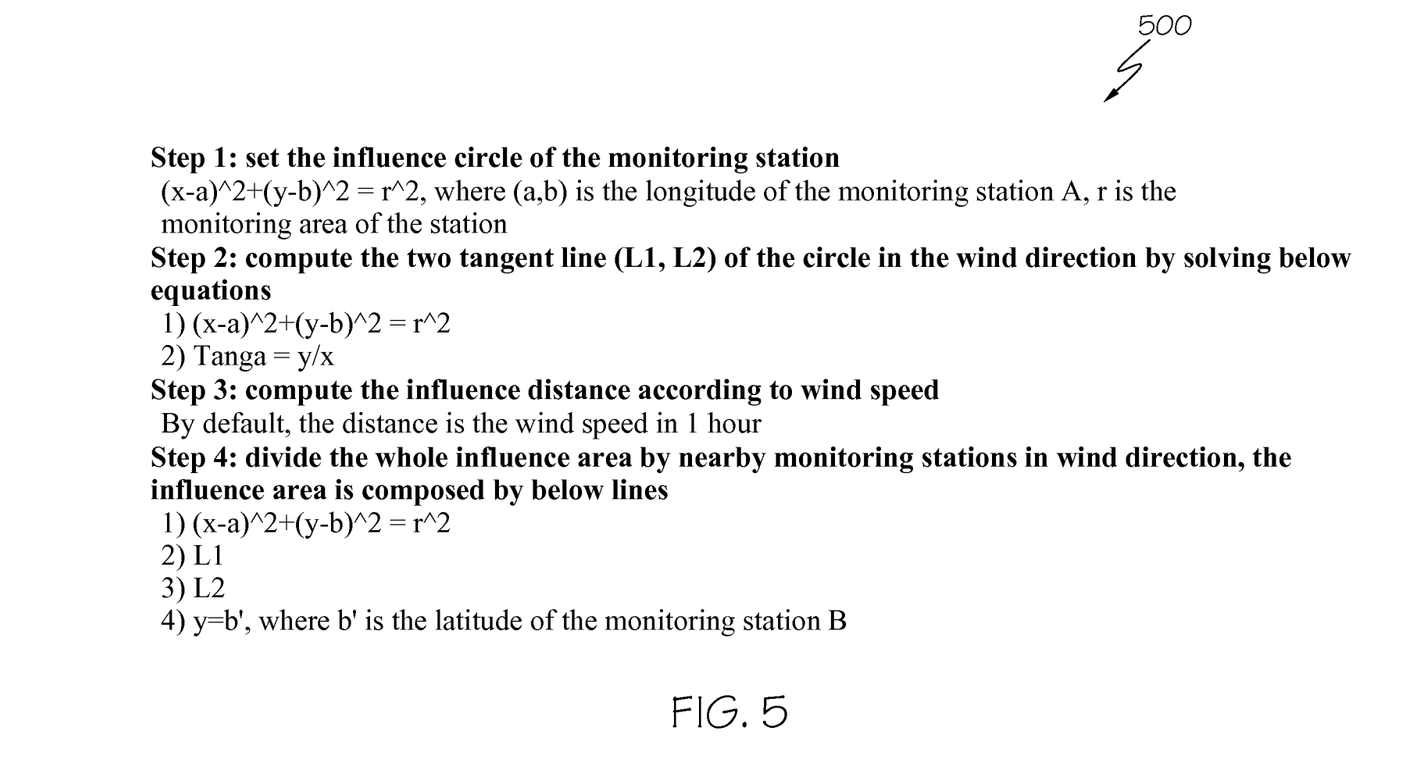
FIG. 5 is an example of calculating an influence area of FIG. 4 and FIG. 6.
Figure 6:
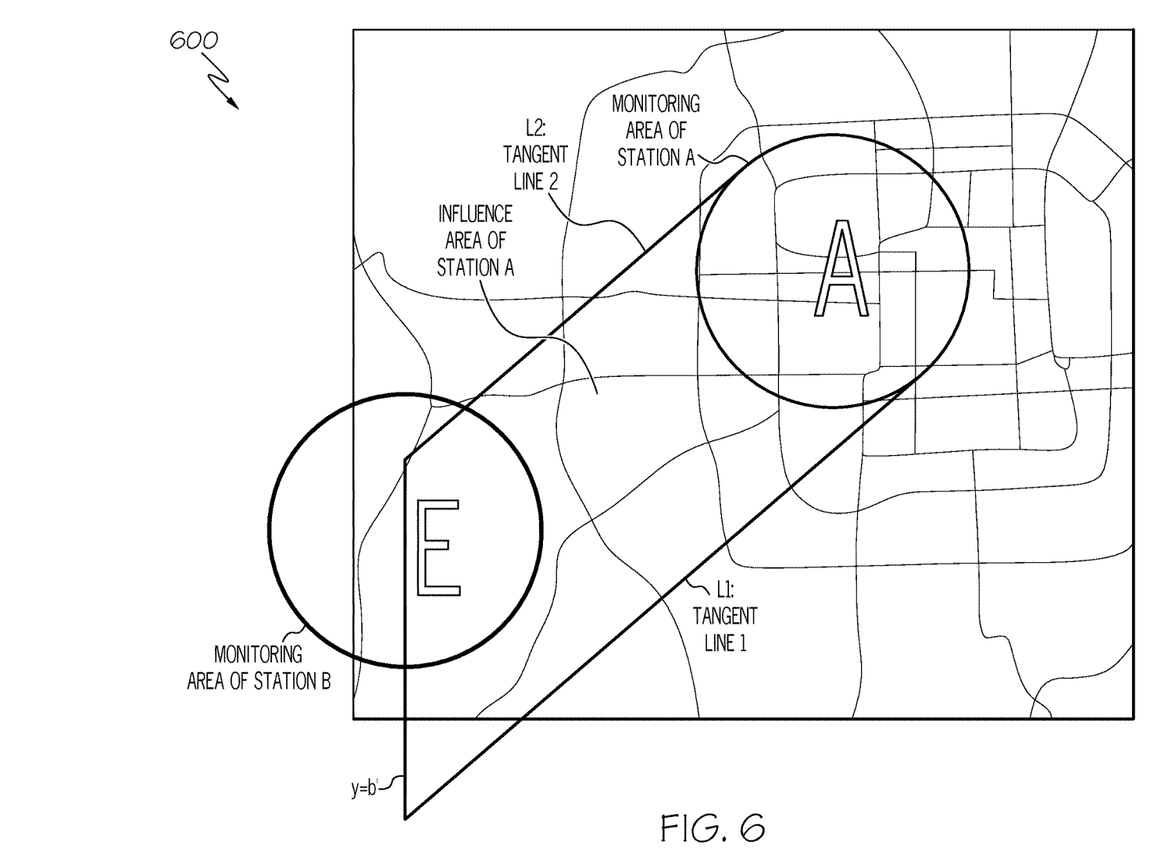
FIG. 6 is a map illustrating the influence area being calculated in accordance with FIG. 5.

FIG. 5 is a diagram 500 illustrating an example of calculating an influence area of FIG. 4 and FIG. 6. FIG. 6 is a map 600 illustrating the influence area being calculated in accordance with FIG. 4 and FIG. 5.

Experimental Results

Figure 7A:
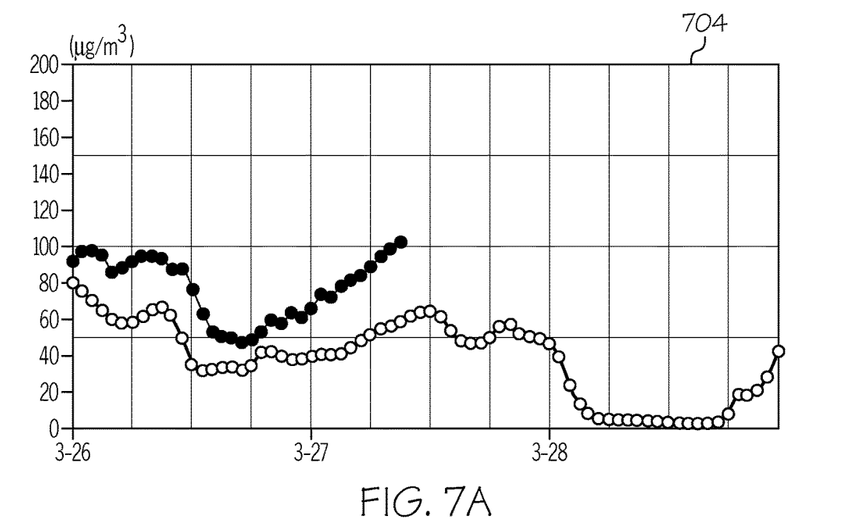
FIGS. 7A and 7B are two graphs of experimental results of the process in FIGS. 2-6.
Figure 7B:
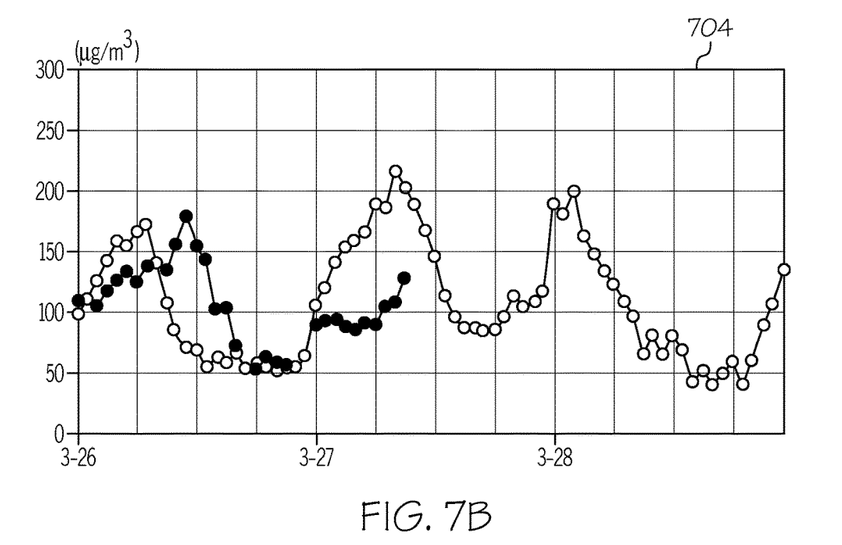

FIGS. 7A and 7B are two graphs of experimental results of the process in FIGS. 2-6. The dark back spots represent the real-time monitoring data. The white spots represent air quality forecast data. Notice that in FIG. 7A the trend data is close but there is a gap. After adapting the pollution inventory, FIG. 7B illustrates that the trending is tracking and the gap in FIG. 7A is reduced.

Generalized Network Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

A cloud computing environment is service oriented with a focus on statelessness, low coupling, modularity, and semantic interoperability. At the heart of cloud computing is an infrastructure comprising a network of interconnected nodes.

Figure 8:
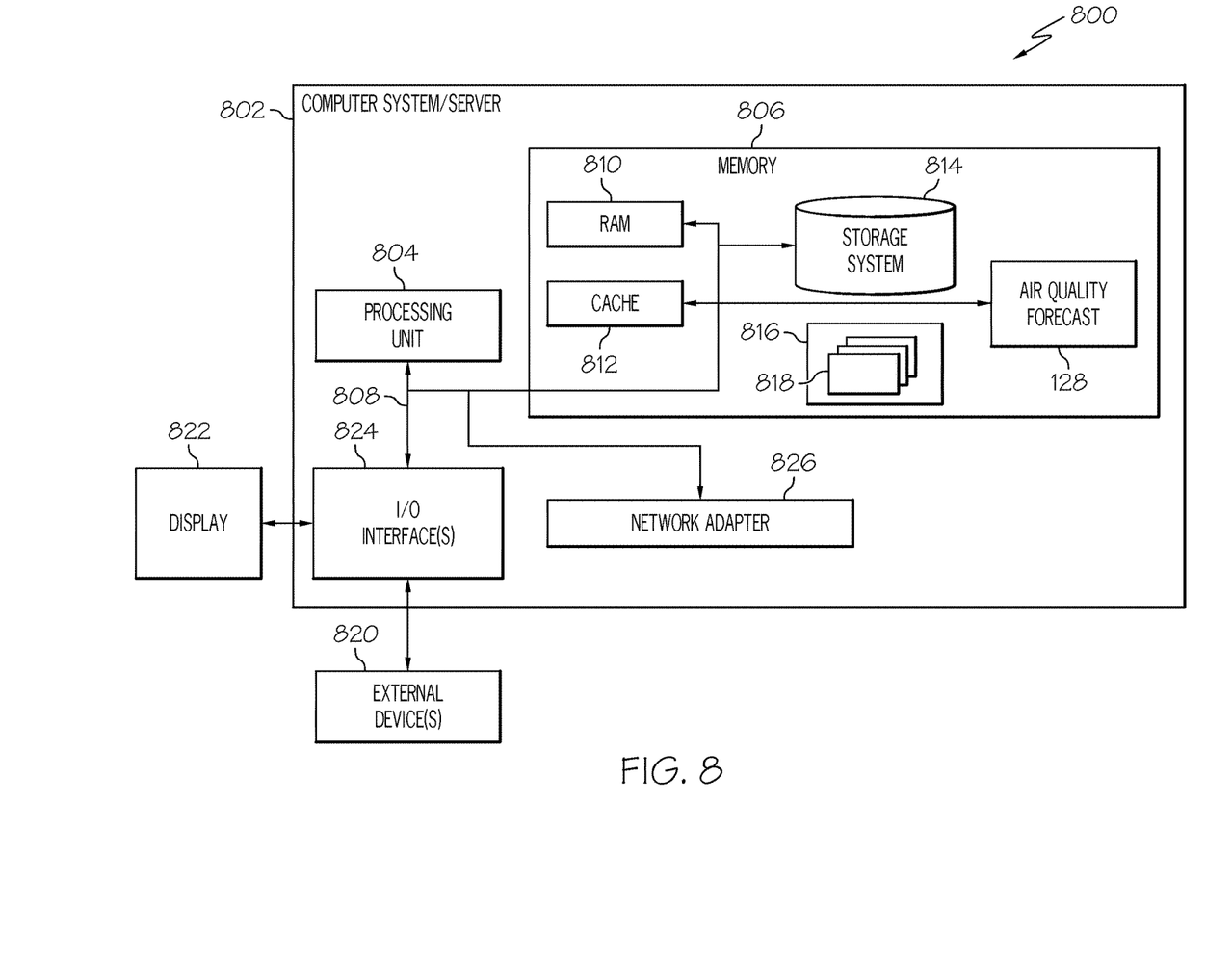
FIG. 8 illustrate one example of a computing node according to one embodiment of the present invention.

Referring now to FIG. 8, a schematic of an example of a computing node is shown. Cloud computing node 800 is only one example of a suitable cloud computing node and is not intended to suggest any limitation as to the scope of use or functionality of embodiments of the invention described herein. Regardless, cloud computing node 800 is capable of being implemented and/or performing any of the functionality set forth hereinabove.

In cloud computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 816, 818, a system memory 806, and a bus 808 that couples various system components including system memory 806 to processor 804.

Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 818, having a set (at least one) of program modules, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of embodiments of the invention as described herein. Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Non-Limiting Examples

The present invention may be a system, a method, and/or a computer program product. The computer program product may include a computer readable storage medium (or media) having computer readable program instructions thereon for causing a processor to carry out aspects of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-based method for computing an air quality forecast, the method comprising:
   accessing by a computer a software-based air quality forecast model, air quality real-time monitoring data, air quality forecast data, forecast variation trend data, real time variation trend data and wind forecast;
   a) performing, by the computer, forecast offset analysis by classifying a difference between the air quality forecast data and the air quality real-time monitoring data, by computing in parallel each of
      an air quality data difference between the air quality forecast data and the air quality real-time monitor data, and based upon the air quality data difference being larger than a threshold, classifying the difference between the air quality forecast data and the air quality real-time monitor data into a second category; and
      a trend data difference between the forecast variation trend data and the real time variation trend data, and based upon the forecast variation trend data and the real time variation trend data being different, classifying the difference between the air quality forecast data and the air quality real-time monitor data into a first category;
   b) performing, by the computer, weather versus air quality forecast result analysis by using the category previously assigned as one of i) the second category of the air quality data difference, ii) the first category of the trend data difference, and iii) neither the first category or the second category, for clustering a difference between the air quality forecast data and the air quality real-time monitoring data under different weather situations of wind direction, wind speed, temperature, and humidity;
   c) performing, by the computer, time versus forecast result analysis by using the first category of the air quality data difference and the second category of the trend data difference, calculating difference data between the air quality forecast data and the air quality real-time monitoring data and clustering the difference data, time data, and a geographic area data;
   d) adapting, by the computer, a pollution emission inventory by reducing an influence caused by weather, by time, and by geographic area based on the time versus forecast result analysis of step c and computing each of
      a main influence area of at least two monitoring stations using the wind forecast including wind speed and wind direction and adapting an emission intensity in the pollution emission inventory according to a difference of specific monitoring station; and
      a surrounding influence area using spatial interpolation using a difference of a forecast result and monitoring result of all monitoring stations to calculate a distance decay and adapting an emission intensity in the pollution emission inventory according to an interpolation result;
   e) executing, by the computer, the software-based air quality forecast model with the pollution emission inventory which has been adapted to provide updated results from the software-based air quality forecast model for a concentration of atmospheric air pollutants in the surrounding influence area; and
   f) plotting, by the computer, both i) the air quality real-time monitoring data and ii) the air quality forecast data versus time on a graph to illustrate the difference there between when using the pollution emission inventory which has been adapted.

2. The computer-based method of claim 1, further comprising, repeating steps a through e based upon at least one of a settable time period elapsing, detecting a change in the air quality forecast data, and detecting a change in the air quality real-time monitoring data.

3. The computer-based method of claim 1, further comprising:

setting an influence region of a first monitoring station using an equation $(x-a)^2+(y-b)^2=r^2$, where a and b are geographic coordinates of the first monitoring station in a Cartesian coordinate system with coordinate functions x and y, r is a radius of a monitoring area of the first monitoring station with a circular perimeter; and computing a first tangent line L1 at a first point on the circular perimeter of the monitoring area and a second tangent line L2 at a second point on the circular perimeter of the monitoring area in a wind direction is defined using:

$$(x-a)^2 + (y-b)^2 = r^2 \text{ and tangent} = \frac{y}{x};$$

computing an influence area by nearby monitoring stations in the wind direction, the influence area is defined using:

$$(x-a)^2+(y-b)^2=r^2,$$

L1, L2, and y=b', where b' is one of the geographic coordinates of a second monitoring station.

4. The computer-based method of claim 1, wherein the adapting a pollution emission inventory by the main influence area further includes performing each of:
f) computing
an influence direction based on a wind direction,
a monitoring station influence circular area of each monitoring station, and
two tangent lines to the monitoring station influence circular area in the wind direction;
g) computing an influence distance based on a distance to monitoring stations;
h) determining that an additional monitoring station is within in a total influence area; and
i) dividing the total influence area by monitoring stations in the wind direction,
wherein the total influence area is the main influence area combined with the surrounding influence area.

5. A system for computing an air quality forecast, the system comprising
a memory;
at least one hardware processor communicatively coupled to the memory, where the processor is configured to perform
a) performing, by the at least one hardware processor, forecast offset analysis by classifying a difference between the air quality forecast data and the air quality real-time monitoring data, by computing in parallel each of
an air quality data difference between the air quality forecast data and the air quality real-time monitor data, and based upon the air quality data difference being larger than a threshold, classifying the difference between the air quality forecast data and the air quality real-time monitor data into a second category; and
a trend data difference between the forecast variation trend data and the real time variation trend data, and based upon the forecast variation trend data and the real time variation trend data being different, classifying the difference between the air quality forecast data and the air quality real-time monitor data into a first category;

b) performing, by the at least one hardware processor, weather versus air quality forecast result analysis by using the category previously assigned as one of i) the second category of the air quality data difference, ii) the first category of the trend data difference, and iii) neither the first category or the second category, for clustering a difference between the air quality forecast data and the air quality real-time monitoring data under different weather situations of wind direction, wind speed, temperature, and humidity;

c) performing, by the at least one hardware processor, time versus forecast result analysis by using the first category of the air quality data difference and the second category of the trend data difference, calculating difference data between the air quality forecast data and the air quality real-time monitoring data and clustering the difference data, time data, and a geographic area data;

d) adapting, by the at least one hardware processor, a pollution emission inventory by reducing an influence caused by weather, by time, and by geographic area based on the time versus forecast result analysis of step c and computing each of
a main influence area of at least two monitoring stations using the wind forecast including wind speed and wind direction and adapting an emission intensity in the pollution emission inventory according to a difference of specific monitoring station; and
a surrounding influence area using spatial interpolation using a difference of a forecast result and monitoring result of all monitoring stations to calculate a distance decay and adapting an emission intensity in the pollution emission inventory according to an interpolation result;

e) executing, by the at least one hardware processor, the software-based air quality forecast model with the pollution emission inventory which has been adapted to provide updated results from the software-based air quality forecast model for a concentration of atmospheric air pollutants in the surrounding influence area; and f) plotting, by the at least one hardware processor, both i) the air quality real-time monitoring data and ii) the air quality forecast data versus time on a graph to illustrate the difference there between when using the pollution emission inventory which has been adapted.

6. The system of claim 5, further comprising, repeating steps a through e based upon at least one of a settable time period elapsing, detecting a change in the air quality forecast data, and detecting a change in the air quality real-time monitoring data.

7. The system of claim 5, further comprising:
setting an influence region of a first monitoring station using an equation $(x-a)^2+(y-b)^2=r^2$, where a and b are geographic coordinates of the first monitoring station in a Cartesian coordinate system with coordinate functions x and y, r is a radius of a monitoring area of the first monitoring station; and
computing a first tangent line L1 and a second tangent line L2 of the monitoring area in a wind direction is defined using:

$$(x-a)^2 + (y-b)^2 = r^2 \text{ and tangent} = \frac{y}{x};$$

computing an influence area by nearby monitoring stations in the wind direction, an influence area is defined using:

$$(x-a)^2+(y-b)^2=r^2,$$

L1, L2, and
y=b', where b' is one of the geographic coordinates of a second monitoring station.

8. The system of claim 5, wherein the adapting a pollution emission inventory by the main influence area further includes performing each of:

f) computing
an influence direction based on a wind direction,
a monitoring station influence circular area of each monitoring station, and
two tangent lines to the monitoring station influence circular area in the wind direction;

g) computing an influence distance based on a distance to monitoring stations;

h) determining that an additional monitoring station is within in a total influence area; and i) dividing the total influence area by monitoring stations in the wind direction, wherein the total influence area is the main influence area combined with the surrounding influence area.

9. A non-transitory computer program product for computing an air quality forecast comprising a computer readable storage medium having computer readable program code embodied therewith, the computer readable program code configured to perform with at least one hardware processor:

a) performing, by the at least one hardware processor, forecast offset analysis by classifying a difference between the air quality forecast data and the air quality real-time monitoring data, by computing in parallel each of
an air quality data difference between the air quality forecast data and the air quality real-time monitor data, and based upon the air quality data difference being larger than a threshold, classifying the difference between the air quality forecast data and the air quality real-time monitor data into a second category; and
a trend data difference between the forecast variation trend data and the real time variation trend data, and based upon the forecast variation trend data and the real time variation trend data being different, classifying the difference between the air quality forecast data and the air quality real-time monitor data into a first category;

b) performing, by the at least one hardware processor, weather versus air quality forecast result analysis by using the category previously assigned as one of i) the second category of the air quality data difference, ii) the first category of the trend data difference, and iii) neither the first category or the second category, for clustering a difference between the air quality forecast data and the air quality real-time monitoring data under different weather situations of wind direction, wind speed, temperature, and humidity;

c) performing, by the at least one hardware processor, time versus forecast result analysis by using the first category of the air quality data difference and the second category of the trend data difference, calculating difference data between the air quality forecast data and the air quality real-time monitoring data and clustering the difference data, time data, and a geographic area data;

d) adapting, by the at least one hardware processor, a pollution emission inventory by reducing an influence caused by weather, by time, and by geographic area based on the time versus forecast result analysis of step c and computing each of
a main influence area of at least two monitoring stations using the wind forecast including wind speed and wind direction and adapting an emission intensity in the pollution emission inventory according to a difference of specific monitoring station; and
a surrounding influence area using spatial interpolation using a difference of a forecast result and monitoring result of all monitoring stations to calculate a distance decay and adapting an emission intensity in the pollution emission inventory according to an interpolation result;

e) executing, by the at least one hardware processor, the software-based air quality forecast model with the pollution emission inventory which has been adapted to provide updated results from the software-based air quality forecast model for a concentration of atmospheric air pollutants in the surrounding influence area; and f) plotting, by the at least one hardware processor, both i) the air quality real-time monitoring data and ii) the air quality forecast data versus time on a graph to illustrate the difference there between when using the pollution emission inventory which has been adapted.

10. The non-transitory computer program of claim 9, further comprising, repeating steps a through e based upon at least one of a settable time period elapsing, detecting a change in the air quality forecast data, and detecting a change in the air quality real-time monitoring data.

11. The non-transitory computer program product of claim 9, further comprising:
setting an influence region of a first monitoring station using an equation $(x-a)^2+(y-b)^2=r^2$, where a and b are geographic coordinates of the first monitoring station in a Cartesian coordinate system with coordinate functions x and y, r is a radius of a monitoring area of the first monitoring station; and
computing a first tangent line L1 and a second tangent line L2 of the monitoring area in a wind direction is defined using:

$$(x-a)^2 + (y-b)^2 = r^2 \text{ and tangent} = \frac{y}{x};$$

computing an influence area by nearby monitoring stations in the wind direction, an influence area is defined using:

$$(x-a)^2+(y-b)^2=r^2,$$

L1, L2, and
y=b', where b' is one of the geographic coordinates of a second monitoring station.

12. The non-transitory computer program product of claim 9, wherein the adapting a pollution emission inventory by the main influence area further includes performing each of:

f) computing
an influence direction based on a wind direction, a monitoring station influence circular area of each monitoring station, and two tangent lines to the monitoring station influence circular area in the wind direction;

g) computing an influence distance based on a distance to 5 monitoring stations;

h) determining that an additional monitoring station is within in a total influence area; and i) dividing the total influence area by monitoring stations in the wind direction, wherein the total influence area is the main influence area combined with the surrounding influence area.

* * * * *